W. E. GARDNER.
END GATE AND LOCKING MEANS THEREFOR.
APPLICATION FILED DEC. 15, 1916.
1,239,899. Patented Sept. 11, 1917.
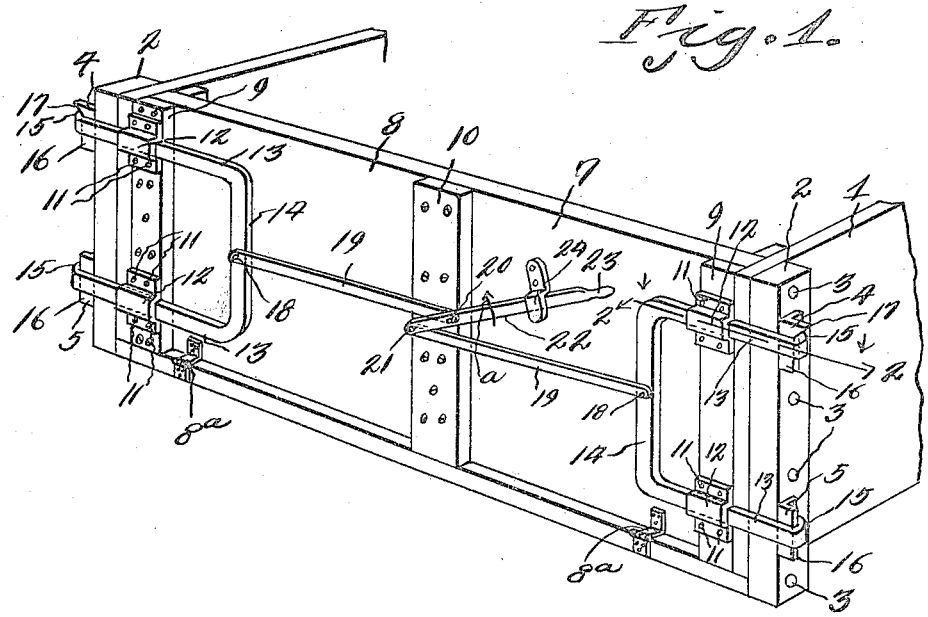
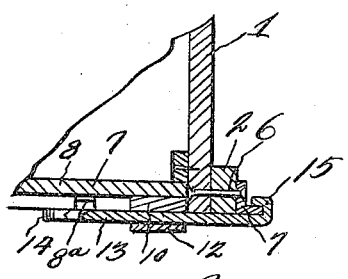
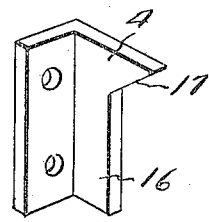
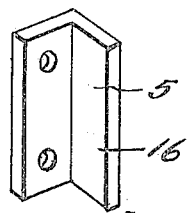
Inventor
W. E. Gardner
Witnesses
By
Attorneys

UNITED STATES PATENT OFFICE.

WALLACE E. GARDNER, OF ST. JOSEPH, MISSOURI.

END-GATE AND LOCKING MEANS THEREFOR.

1,239,899.  Specification of Letters Patent.  Patented Sept. 11, 1917.

Application filed December 15, 1916. Serial No. 137,212.

*To all whom it may concern:*

Be it known that I, WALLACE E. GARDNER, a citizen of the United States, residing at St. Joseph, in the county of Buchanan, State of Missouri, have invented a new and useful End-Gate and Locking Means Therefor; and I do hereby declare the following to be a full, clear, and exact description of the invention, such as will enable others skilled in the art to which it appertains to make and use the same.

This invention relates to an improved end gate and locking means therefor, and an object of the invention is to provide sliding U-bolts mounted in guides of the end gate and having their extremities terminating in hooks to engage keeper plates at the side rear ends of the body of a wagon, to prevent displacement of the gate rearwardly.

A further object of the invention is to provide means on the uppermost keeper plates to prevent upward movement of the gate by coöperating with the uppermost hooks of said U-bolts.

A further object of the invention is the provision of means for simultaneously operating said U-bolts.

In practical fields, the details of construction may necessitate alterations falling within the scope of what is claimed.

The invention comprises further features and combination of parts, as hereinafter set forth, shown in the drawings, and claimed.

In the drawings:—

Figure 1 is a view in perspective of a portion of a wagon body, showing the locking or latching means as applied to the end gate thereof.

Fig. 2 is a sectional view on line 2—2 of Fig. 1.

Fig. 3 is a detail perspective view of one of the uppermost keeper plates.

Fig. 4 is a detail perspective view of one of the lowermost keeper plates.

Referring more especially to the drawings, 1 designates a portion of a wagon body which is provided with the exterior cleats 2 secured by the bolts 3. Each cleat 2 is provided with the upper and lower angular keeper plates 4 and 5, which are secured by the riveted bolts 6 to the cleats 2, as shown clearly in Fig. 2, said riveted bolts 6 also passing through the sides of the body of the wagon. The end gate 7 comprises the body part 8, to the rear face of which the end and intermediate cleats 9 and 10 are secured. Secured to the cleats 9 by means of the bolts 11 are the arched plates 12, which constitute guides for the arms 13 of the U-bolts 14. The extremities of the arms terminate in the overhanging hooks 15, which engage the lateral flanges 16 of said keeper plates, thereby preventing rearward movement of the end gate. The lateral flanges 16 of the keeper plates 4 are provided with V-shaped extensions or tongues 17, which overhang the hooks 15 of the uppermost arms of said U-bolts, thereby preventing upward movement of the gate. Pivoted at 18 to the U-bolts are the links 19, and they have their inner ends in turn pivoted at 20 and 21 to the lever 22, which is provided with a handle 23. When the U-bolts are so placed as to lock or to prevent movement of the end gate, the lever 22 is arranged, as shown in Fig. 1, so as to engage under the overhanging arm of the plate 24, which is secured to the end gate. To remove the gate, the lever is first disengaged from the plate 24 by forcing the same downwardly and slightly rearwardly and then moving said lever in the direction of the arrow *a*, which, by means of the links 19, will throw or move the U-bolts laterally outwardly, thereby disengaging the hook 15 from the lateral flanges 16 of said keeper plates 4 and 5, so that the end gate may be disconnected rearwardly. It is to be noted that when said U-bolts are moved, the movements are sufficient to carry the hooks 15 of the uppermost arms 13 of the U-bolts sufficiently laterally outwardly to escape the V-shaped extensions or tongues 17, whereby the gate may be raised upwardly, if so desired. The engagement of the hooks 15 with the keeper plates 4 and 5, and the engagement of the lever 22 with the plate 24 pull against each other through the medium of said parts. The gate 8 is hinged at 8ª to the wagon body, so that when the hooks 15 are disengaged from their keepers by the operation of the U-bolts 14, the gate may be swung downwardly.

The invention having been set forth, what is claimed as new and useful, is:—

In combination with a wagon body having upper and lower angular keeper plates on the outer faces of the sides of the body at the tail end edges of said sides, a tail end gate disposed between the sides of the body, U-shaped locking bars, one adjacent each end of the gate and having its arms engaging flat against the rear edges of the sides of the body, the outer extremities of the arms terminating in U-shaped hooks engaging over the lateral flanges of the keeper plates, forwardly and inwardly, to prevent rear movement of the end gate, the upper ends of the lateral flanges of the upper keeper plates having laterally extending V-shaped projections, the lower edges of which overlie the upper hooks, acting to force downwardly on the same to hold the lower edge of the gate in contact with the bottom of the body, guides secured to the rear face of the gate in which the arms of the locking bars are guided, a keeper on the rear face of the gate, links connected to the arches of the U-shaped locking bars, and a lever connecting the links, whereby, as the lever is moved to engage the keeper of the gate, the U-shaped terminal hooks of the arms are drawn closely in engagement with the lateral flanges of the keepers.

In testimony whereof I have signed my name to this specification in the presence of two subscribing witnesses.

WALLACE E. GARDNER.

Witnesses:
CHARLES C. SUDDITH,
FRANK F. SMITH.

Copies of this patent may be obtained for five cents each, by addressing the "Commissioner of Patents, Washington, D. C."